US009088555B2

(12) United States Patent
Koved et al.

(10) Patent No.: US 9,088,555 B2
(45) Date of Patent: Jul. 21, 2015

(54) METHOD AND APPARATUS FOR SERVER-SIDE AUTHENTICATION AND AUTHORIZATION FOR MOBILE CLIENTS WITHOUT CLIENT-SIDE APPLICATION MODIFICATION

(71) Applicant: International Business Machines Corporation, Armonk, NY (US)

(72) Inventors: Lawrence Koved, Pleasantville, NY (US); Kapil Kumar Singh, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 13/856,931

(22) Filed: Apr. 4, 2013

(65) Prior Publication Data

US 2014/0189809 A1      Jul. 3, 2014

Related U.S. Application Data

(60) Provisional application No. 61/746,509, filed on Dec. 27, 2012.

(51) Int. Cl.
*H04L 29/06* (2006.01)
*H04W 12/06* (2009.01)

(52) U.S. Cl.
CPC .............. *H04L 63/08* (2013.01); *H04W 12/06* (2013.01)

(58) Field of Classification Search
CPC ... G06F 21/32; G10L 17/005; H04L 63/0861; H04L 9/3215; H04L 9/3231; H04L 63/08; H04L 2209/56; H04L 2209/08

USPC ................... 726/3, 4; 713/186; 704/E17.003
See application file for complete search history.

(56) References Cited

U.S. PATENT DOCUMENTS

| 6,934,858 | B2 * | 8/2005 | Woodhill .......................... 726/5 |
| 7,801,510 | B2 * | 9/2010 | Jung et al. ..................... 455/411 |
| 8,256,664 | B1 * | 9/2012 | Balfanz et al. ................ 235/375 |
| 2003/0163739 | A1 * | 8/2003 | Armington et al. ........... 713/202 |
| 2004/0139349 | A1 | 7/2004 | Henn et al. |
| 2004/0167984 | A1 | 8/2004 | Herrmann |
| 2006/0015358 | A1 * | 1/2006 | Chua ................................ 705/1 |

(Continued)

OTHER PUBLICATIONS

International Search Report dated Apr. 23, 2014.

(Continued)

*Primary Examiner* — William Powers
*Assistant Examiner* — Tongoc Tran
(74) *Attorney, Agent, or Firm* — Anne V. Dougherty, Esq.; McGinn IP Law Group, PLLC

(57) ABSTRACT

A method (and structure) for enforcing authentication and authorization includes making a resource access request, by a client application being executed by a processor on a digital device, to invoke authentication and authorization services to evaluate the resource access request by the client application. A security application on the digital device is activated and executed, the security application being separate from the client application, the security application including instructions for processing a challenge-response protocol for the resource access request. The client application communicates outside the digital device using a primary communication channel and the security application uses a secondary communication channel that is out-of-band from the primary communication channel.

20 Claims, 5 Drawing Sheets

(56) References Cited

U.S. PATENT DOCUMENTS

| | | | |
|---|---|---|---|
| 2007/0050852 A1* | 3/2007 | Yoshii et al. | 726/27 |
| 2008/0196101 A1* | 8/2008 | Sade et al. | 726/22 |
| 2009/0259848 A1* | 10/2009 | Williams et al. | 713/168 |
| 2012/0030742 A1* | 2/2012 | Lundblade | 726/6 |
| 2012/0159603 A1* | 6/2012 | Queck | 726/9 |
| 2012/0240204 A1* | 9/2012 | Bhatnagar et al. | 726/5 |
| 2013/0111038 A1 | 5/2013 | Girard | |
| 2013/0225128 A1 | 8/2013 | Gomar | |
| 2013/0297513 A1* | 11/2013 | Kirillin et al. | 705/67 |
| 2013/0347089 A1 | 12/2013 | Bailey et al. | |

OTHER PUBLICATIONS

Written Opinion of the International Search Report dated Apr. 23, 2014.

* cited by examiner

METHOD AND APPARATUS FOR SERVER-SIDE AUTHENTICATION AND AUTHORIZATION FOR MOBILE CLIENTS WITHOUT CLIENT-SIDE APPLICATION MODIFICATION

CROSS-REFERENCE TO RELATED APPLICATIONS

The present Application claims priority to U.S. Provisional Application No. 61/746,509, having filing date Dec. 27, 2012, all contents of which are incorporated herein by reference.

This invention was made with Government support under Contract No. FA8750-12-C-0265 awarded by the Department of Homeland Security (DHS). The Government has certain rights in this invention.

BACKGROUND OF THE INVENTION

1. Field of the Invention

The present invention generally relates to authentication for mobile applications and, more specifically, a security application that is independent of client applications on a mobile device using a secondary out-of-band channel for authentication, in contrast to the normal transmission channel normally used by applications on the mobile device.

2. Description of the Related Art

Conventional mobile client applications request data and services from network-based or server-based systems (hereinafter referred to as "network services"). Often these network services contain sensitive data or provide sensitive services that require that the user of the mobile device provide security credentials to the network services.

However, the ability for a mobile application to adopt a wide range of authentication challenge-responses is intractable, meaning that it is impractical or impossible, especially for the adoption of emerging technologies in mobile contexts, such as biometric or geolocation authentication, where the authentication protocols are not yet standardized.

Therefore, mobile devices create both new opportunities and new challenges for the authentication function. On the one hand, the readily-available sensors provide opportunity for new authentication credentials, such as biometrics and context of the device. On the other hand, the ability for existing mobile applications to dynamically adapt to support a wide range of ever changing authentication challenge types remains impractical or impossible, particularly for adopting new authentication technologies.

SUMMARY OF THE INVENTION

In view of the foregoing, and other, exemplary problems, drawbacks, and disadvantages of the conventional systems, it is an exemplary feature of the present invention to provide a structure (and method) in which security aspects such as authentication and authorization functions are handled in a security application that is separated from client applications that make resource access requests requiring authentication and/or authorization.

It is another exemplary feature of the present invention to provide a structure and method that facilitates and simplifies development of client applications by eliminating the need for such client applications themselves to include authentication and authorization functions.

It is another exemplary feature of the present invention to provide a mechanism by which authentication and authorization functions on a digital device are separated in a security app that can be updated separately as new technological requirements and opportunities arise, without affecting client applications currently installed on the digital device.

In a first exemplary aspect of the present invention, to achieve the above and other features and objectives, described herein is a method of enforcing authentication and authorization, including making a resource access request, by a client application being executed by a processor on a digital device, to invoke authentication and authorization services to evaluate the resource access request by the client application; and activating and executing a security application on the digital device, the security application being separate from the client application, the security application comprising instructions for processing a challenge-response protocol for the resource access request, with the client application communicating outside the digital device using a primary communication channel and the security application using a secondary communication channel that is out-of-band from the primary communication channel.

In a second exemplary aspect of the present invention, also described herein is a method of enforcing authentication and authorization to a resource, including receiving, in a network services authentication service, as executed by a processor on a computer, a resource access request from a client application on a user digital device, using a primary communication channel normally used by the client application; and if an authentication and authorization processing is necessary for the received resource access request: suspending temporarily a processing of the resource access request; providing a push notification to a security application on the digital device that sent the resource access request, the push notification initiating a challenge/response protocol for the resource access request; removing the temporary suspension of the resource access request if a processing of the challenge/response protocol is successful; and rejecting the resource access request if the processing of the challenge/response protocol is unsuccessful.

In a third exemplary aspect of the present invention, also described herein is a security app, as comprising a program of machine-readable instructions tangibly embodied on a non-transitory, computer-readable storage medium and executable by a digital processor when installed on a digital processing apparatus, the security app comprising instructions for: receiving a push notification signal from an authentication and authorization service that is responding to a resource access request from a client app installed on the digital processing apparatus; and executing a challenge/response protocol processing for the resource access request, wherein the security app is separate from the client app on the digital processing apparatus.

In a fourth exemplary aspect of the present invention, also described herein is an apparatus, including a processor; and a memory, wherein the memory includes a first set of instructions to be selectively executed by the processor as a client app and a second set of instructions to be selectively executed by the processor as a security app, the security app being separate from the client app and the security app comprising instructions to process a challenge/response protocol for service requests initiated by the client app.

Thus, the present invention provides a flexible framework that uses an out-of-band authentication channel for mobile applications or other digital devices which use authentication and/or authorization of client applications. This new framework allows applications to delegate authentication to an independent security service on the client that is adaptable to support a broad range of authentication protocols. The network services-driven approach supports administration and enablement of new client-side authentication techniques and security policies, usually with no required application modifications.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF EXEMPLARY EMBODIMENTS OF THE INVENTION

Figure 1:
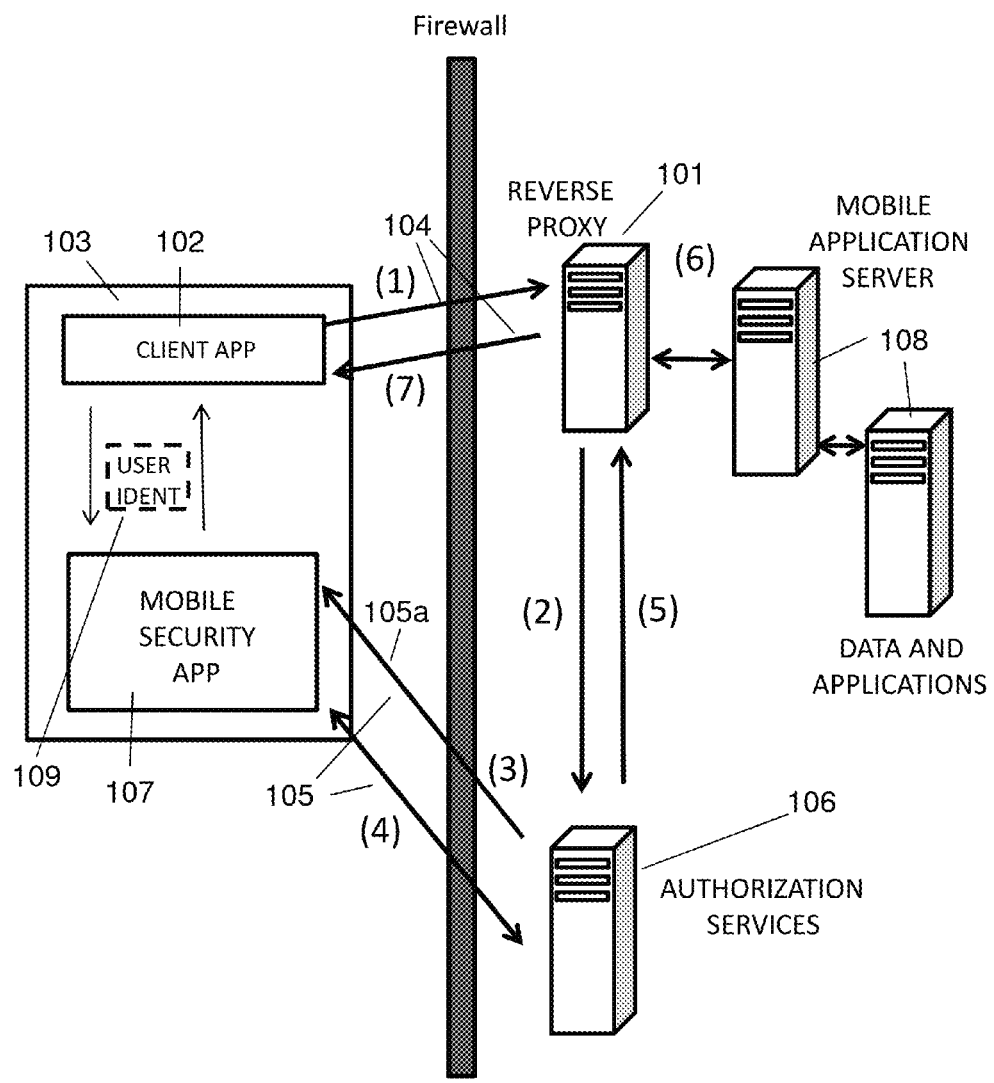
FIG. 1 shows a high-level architecture 100 of a first exemplary embodiment of the present invention.
Figure 2:
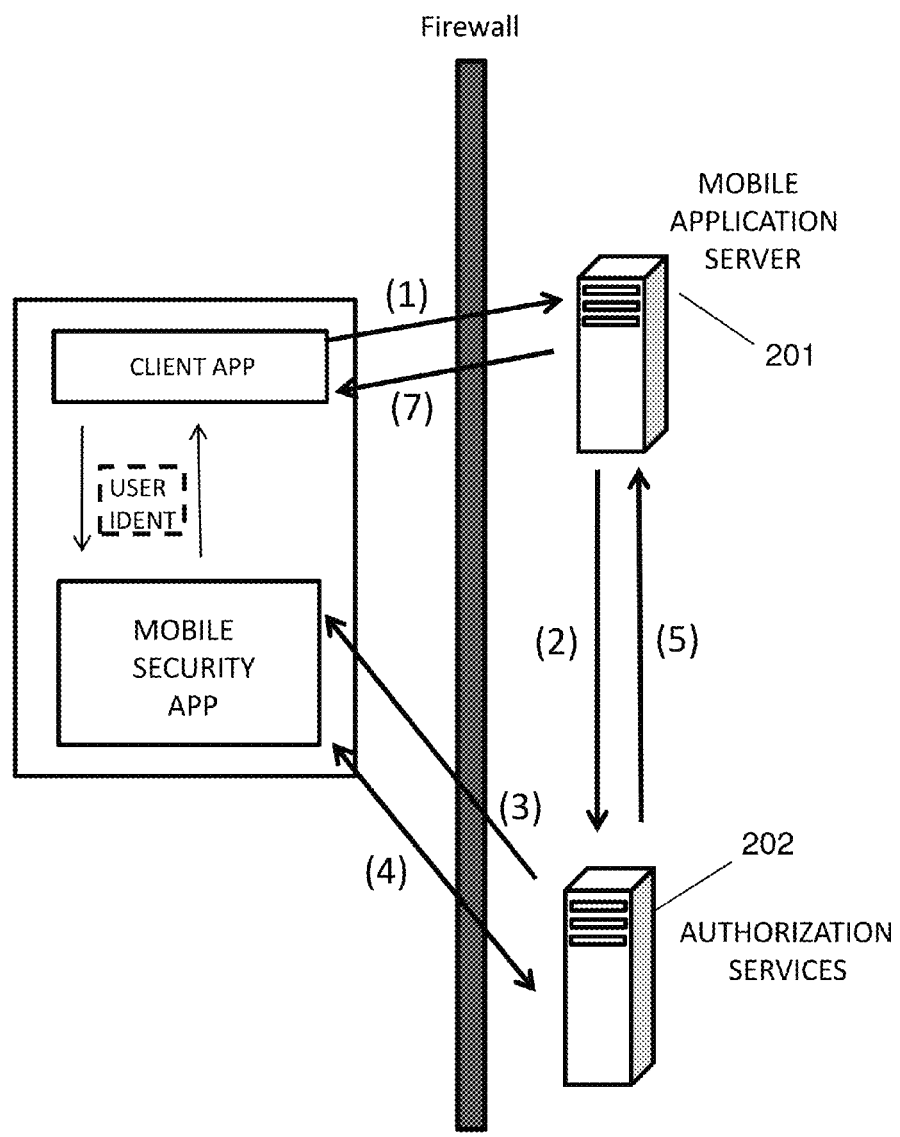
FIG. 2 shows a high-level architecture 200 of a second exemplary embodiment having no proxy.

Referring now to the drawings, and more particularly to FIGS. 1-5, exemplary embodiments of the method and structures according to the present invention will now be described.

Mobile client applications request data and services from network-based or server-based systems, and these network services typically contain sensitive data or provide sensitive services that require that the user of the mobile device provide security credentials to the network services. All applications that expect to receive authentication challenges from the network services need to implement all of the possible authentication challenge-response protocols. The simplest, and most prevalent authentication challenge-response, is that the user is prompted for userid/password entry.

The ability for a mobile application to adopt a wide range of authentication challenge-responses is intractable, especially for the adoption of emerging technologies in mobile contexts, such as biometric or geolocation authentication, where the authentication protocols are not yet standardized. A big problem for application developers is that many of the authentication challenges are not known when the mobile application is developed.

More importantly, it is very common in enterprise environments for a security proxy technology to sit between the mobile device and the network service. This proxy provides enterprise-wide authentication and authorization, and may also provide single sign-on services. As enterprise authentication requirements evolve over time, the challenges the proxy generates are likely not to have been implemented by the mobile application developer.

To address the challenge of supporting a broad range of evolving authentication challenge-response protocols, application development should ideally be kept independent of the authentication protocols. This consequently motivates the development of a pluggable framework to which applications can readily delegate to handle the challenge-response protocols for authentication.

The present invention provides a novel architecture of such a framework and a high-level protocol that enables the mobile application to remain unaware of the network-based authentication challenges. Thus, in a first aspect of the present invention, the authentication challenge-response handling is separate from the mobile application and offers this security functionality as a separate mobile application or service on the mobile device. The authentication challenge-response protocol between the network service and the mobile device is handled by this specialized security application or service, as separate from the mobile application(s) on the mobile device.

With this method of the present invention, as new network services authentication-challenge techniques and protocols are implemented and deployed, only the mobile security application needs to be updated to handle the new protocol, not the multitude of client applications that use network services. This approach therefore provides significant improvement over the current state of the art where the application developer needs to include handling of all possible authentication challenge-response protocols.

In a second key aspect of the present invention, the protocol that is used for authentication employs an out-of-band channel between the authentication and authorization services and the security application. The protocol is initiated by the network-based authentication and authorization service that makes a push notification call to the security service on the mobile client. This notification to the mobile client initiates the communication between the two participating parties. Once authentication processing over this secondary channel is complete, communication between the mobile application and the network service resumes in accordance to a successful or unsuccessful authorization of the request.

In the context of the present invention, the term "out-of-band channel" refers to using a secondary channel that is different from the channel being used by an application that the user of the mobile device has invoked for operation. That is, in view that an exemplary embodiment of the present invention is directed to mobile devices having receive/transmit (RT) capability, this secondary channel might use a different transmission frequency from that of the primary channel, but such frequency difference is not necessary, since the two channels (i.e., the primary channel and the secondary channel) can be isolated by means other than frequency, including mechanisms for timing or by using different protocols or using different protocol software layers or network addresses in which different data can selectively be differently treated, including such mechanisms as using a different TCP/IP port or socket.

Along this line, it is noted that if the concepts of the present invention were to be implemented in an environment other than mobile devices, the out-of-band channel may more logically be the more generic definition that this term refers to using a secondary channel that is distinguished in some manner from the primary channel being normally utilized by a the user application.

The secondary out-of-band channel could also use any of a number of known security measures, but such security is, in general, not absolutely required to implement the present invention. The out-of-band channel, as implemented in the present invention, could have the same characteristics each time it is invoked, meaning that it has the same, constant parameters, or, its parameters could change from one instantiation to the next, meaning that various parameters such as timing, frequency, security level, address, or protocol aspects could change based on such aspects as context, history and situation.

Additionally, in the context of the present invention, the term "push notification" refers to the "push" or "server push" style of Internet-based communication, in which the request for a given transaction is initiated by the publisher or central server, as contrasted to a "pull" in which the request for the transmission of information is initiated by the receiver or client. Thus, the notification request in the present invention comes from a unit in the network that functions similar to a network server rather than a request from the user mobile device. Push notification is well known in the art, as it is used for Android/Google or Apple/iOS push notification services.

The push notification mechanism provides advantages in the context of the present invention, particularly providing the capability that the client application can make a service request to a Mobile Application Service, and, should additional authorization be needed, the push notification mechanism can be used to contact the Security Application of the present invention for purpose of obtaining required authentication data. Therefore, push notification permits the security app to remain dormant on the user device until actually activated by an authentication event.

It is further noted that the term "app" is used herein as an abbreviation of "application", as is commonly understood in the art. Therefore, the discussion herein freely intermingles and interchanges these two terms with no intent of any distinction.

Finally, it is noted that the discussion herein refers to "authentication and authorization" services. However, the concepts of the present invention described here are not intended as limited to requiring both authentication and authorization. Rather, it should be clear from this description that the security app concept of the present invention could be applied in situations in which only one of authentication and authorization would be needed for user access requests. In the context of the present invention, "authentication" relates to the verification of the identity of a user and "authorization" relates to the specification of access rights to resources of the user.

Design

In modern mobile platforms, application development has become much more distributed, with growing number of applications being developed by third parties. These third-party app developers often do not have a formal relationship with the network services. The app typically consumes the interfaces exposed by these network services. For example, popular third-party mobile apps consume Facebook data by communicating with Facebook servers using the users' credentials. This scenario presents several concerns. First, the third-party app must be trusted with users' Facebook credentials. This can be quite risky given the untrusted landscape of mobile apps. Second, any modifications or enhancements to the Facebook's authentication mechanism, such as inclusion of biometric credentials, require modifications to all apps that use the Facebook APIs.

To address these limitations, flexibility and security are two exemplary primary goals of the framework design of the present invention. The design in the present invention is network services driven. The service controls the authentication requirements for any request for a resource. Such requirements are imposed in the form of authentication challenges sent to the client by the authentication service.

FIG. 1 shows a high-level architecture 100 of an exemplary embodiment of the framework, as configured with a reverse proxy service 101 that enforces authentication and authorization. When an application 102 from a user mobile device 103 makes a network services request (step 1), the reverse proxy 101 intercepts the request and invokes the authentication and authorization service to send an authentication challenge to the user 102 (Step 2).

Instead of sending the challenge over the primary communication channel 104 used by the client app 102 for communication with the network service 108, a secondary, out-of-band channel 105 of communication is created between the authorization service 106 and a specialized security application 107 on the client device 103. The security application 107 stays dormant on the client device 103 and is only triggered when an application request 104 causes a request in step 2 to the authorization service 106, which generates a push notification in step 3, sent over a push notification channel 105a to the device 103. All authentication services are subsequently performed over this secondary channel 105, shown as steps (3) and (4) in FIG. 1.

While the authentication is performed over this secondary channel 105, the primary communication channel 104 is being blocked by the reverse proxy 101. When the authentication protocol completes on the secondary channel 105, the primary communication channel 104 resumes the communication. If authentication fails and authorization is denied, then the primary communication channel 104 reports the authorization failure. If authorization is successful, the request initiated by the mobile application is forwarded to the network service 108 for processing as usual, step (6).

It should be noted that, although FIG. 1 shows the communication in steps (3) and (4) as bypassing the Reverse Proxy, in practice the actual communication may flow through the Reverse Proxy, but still remain on a secondary communication channel since the primary communication channel remains blocked by the Reverse Proxy.

While the use of a Reverse Proxy is a common deployment pattern for supporting common authentication/authorization services for multiple applications, there are many mobile application services that directly perform the authentication and authorization. Instead of the Reverse Proxy initiating the challenge-response protocol, the Mobile Application Service 201 invokes the Authentication Services 202 in the same way that the Reverse Proxy invoked these services, as exemplarily shown in the embodiment 200 shown in FIG. 2.

Finally, it is noted that it is sometimes desirable to communicate the user identity 109 from the Client App 102 to the Security App 107 (see FIG. 1). From a usability perspective, if the user enters their identity into the Client App 102 then it becomes frustrating and annoying to reenter the same information as part of the security credentials. The communication of the user identity, as well as any other relevant application state, can be passed to the Security App via existing interprocess communication mechanisms.

There are additional benefits of keeping the authentication and authorization logic independent of the applications. In addition to the simplified application development, the same security application can provide authentication and authorization services to multiple client applications. Since the security app does not share any authentication/authorization credentials with the client app, the design of the present invention also enables the protection of such credentials from malicious applications (e.g., such as the fake Netflix App that was found to be stealing Netflix credentials). On the server side, the reverse proxy acts as an effective point where organization mandatory policies, such as corporate security policies, can be enforced. Moreover, the security application can provide additional context for the device (e.g. its location) as part of the challenge-response protocol that, in turn, enables the authentication and authorization service to make rich, context-aware decisions.

The limitations of the approach are associated with the deployment of one or more separate mobile apps to perform the authentication protocols. If shared across multiple network services, protection is needed against spoofing and phishing attacks. Mechanisms and protocols are also needed to allow for updates to the challenge-response protocols that it supports. If the Security App is not shared across multiple network services, then there may be multiple Security Apps concurrently running on the device that need to be managed. Secondly, in some mobile systems, the Security App may need to interrupt the running Client App, take over the user interface (screen), to perform authentication. This interruption may result in a suboptimal user experience. Thus, in a preferred exemplary embodiment, the present invention provides a tight integration between the Security App and multiple network services and between the Security App and Client Apps, in order to reduce disruption to the user.

Figure 3:
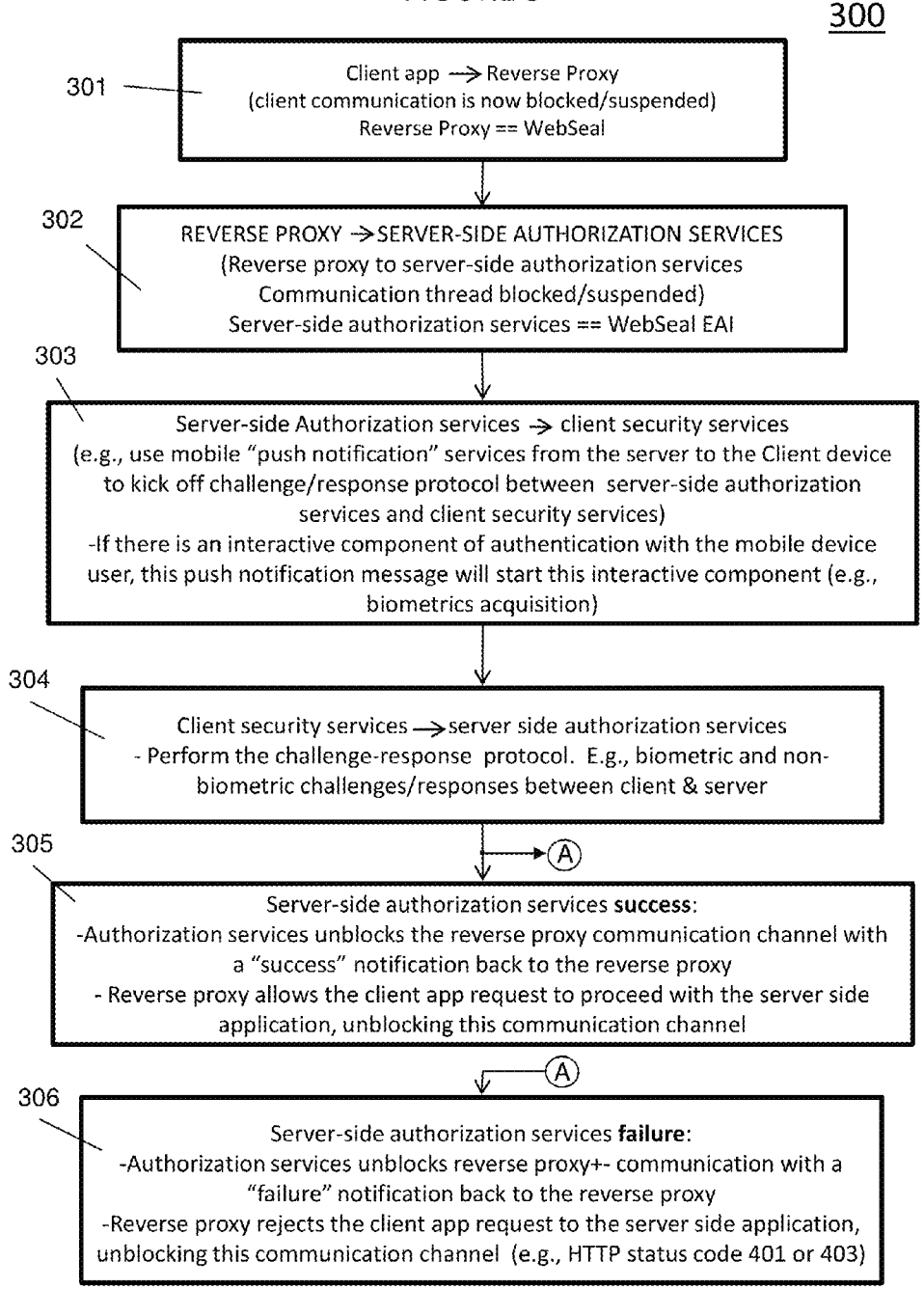
FIG. 3 shows exemplarily a flowchart 300 of a method of the present invention.

FIG. 3 shows in flowchart format 300 the steps explained above concerning actions in the exemplary embodiment of FIG. 1.

In step 301, the reverse proxy server 101 intercepts the request from the client application 102 and blocks further communication until authorization is completed.

In step 302, the reverse proxy server 101 communicates the authorization request to the server-side authorization service server 106.

In step 303, the authorization server 106 uses push notification to the security app 107 in the user device 103, the push notification possibly initiating an authentication process in the user device 103.

In step 304, the out-of-band, secondary communication channel 105 is used to perform the challenge-response protocol.

In step 305, if the authorization process is successful, the reverse proxy 101 communication channel is unblocked so that the client app 102 can proceed with the server side processing.

In step 306, if the authorization process fails, the authorization server 106 sends a failure notification back to the reverse proxy 101, which then rejects the request from the client app 102.

Exemplary Hardware Implementation

Figure 4:
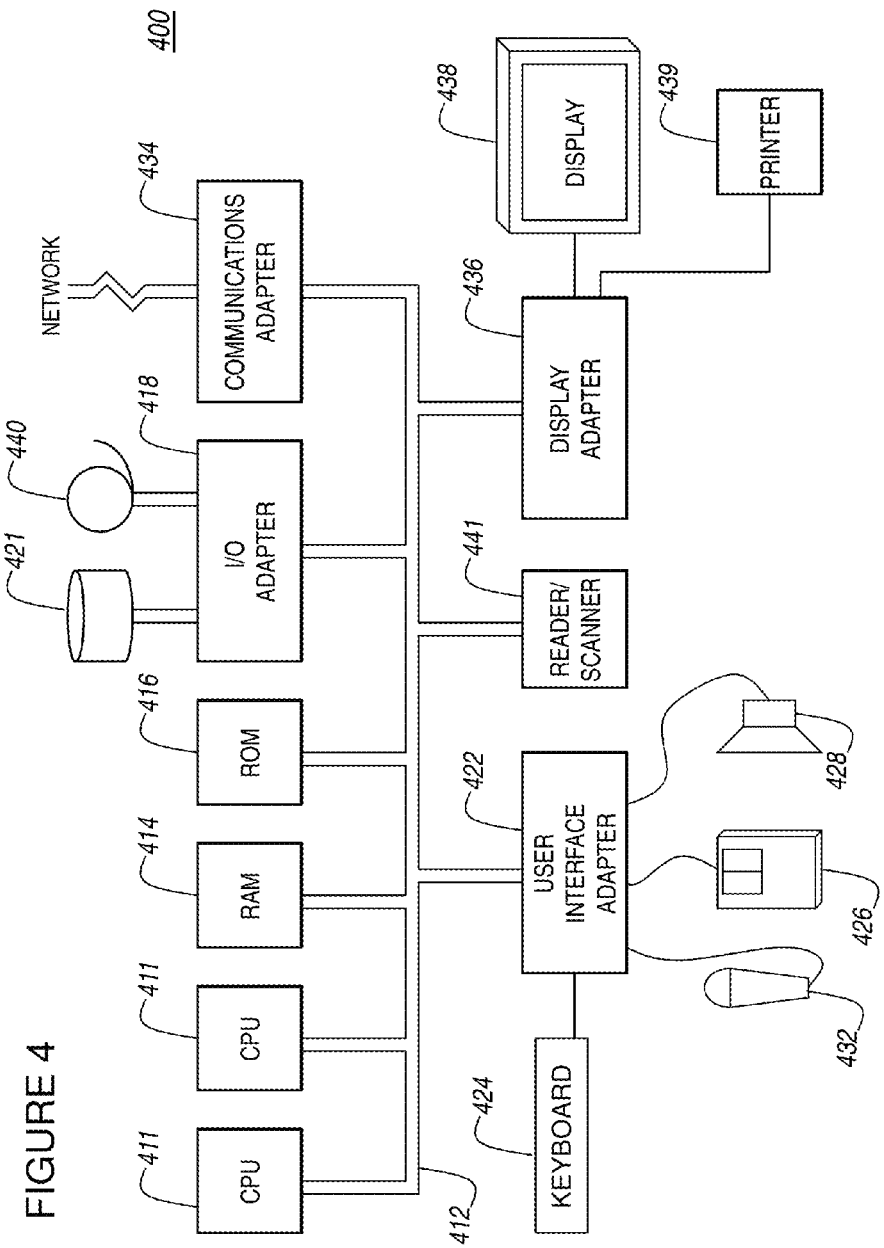
FIG. 4 illustrates an exemplary hardware system 400 for incorporating the present invention therein.
Figure 5:
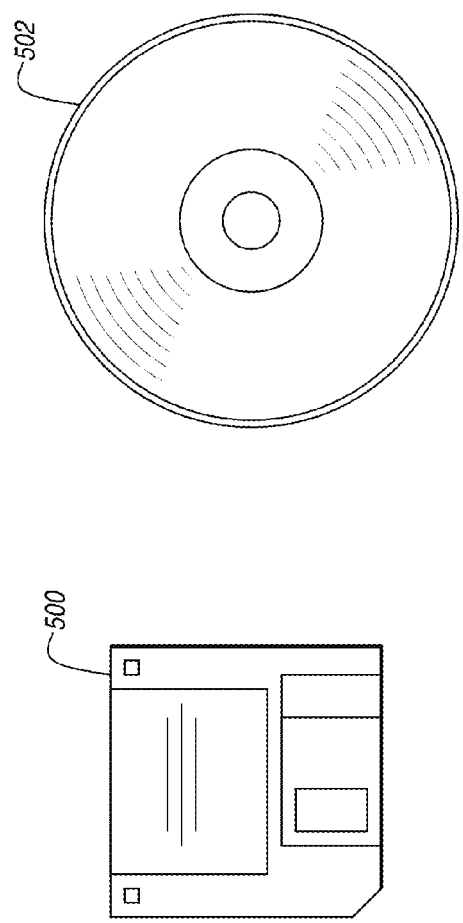
FIG. 5 illustrates a signal bearing storage medium 500 (e.g., storage medium) for storing steps of a program of a method according to the present invention.

FIG. 4 illustrates a typical hardware configuration of an information handling/computer system in accordance with the invention and which preferably has at least one processor or central processing unit (CPU) 411. Such hardware configuration might be utilized for the reverse proxy 101, the authorization server 106, etc., shown exemplarily in FIG. 1 as network devices. Of course, in the context of the user mobile device 103 of FIG. 1, the architecture of FIG. 4 would be modified as incorporating one or more transceivers and would typically be configured as having fewer devices attached via one or more system buses.

The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting an information handling system to a data processing network, the Internet, an Intranet, a personal area network (PAN), etc., and a display adapter 436 for connecting the bus 412 to a display device 438 and/or printer 439 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising non-transitory signal-bearing storage media tangibly embodying a program of machine-readable instructions executable by a digital data processor incorporating the CPU 411 and hardware above, to perform the method of the invention. The descriptive "signal-bearing" is intended as conveying that the stored instructions provide a functional interaction with the system upon execution by the processor(s).

This signal-bearing media may include, for example, a RAM contained within the CPU 411, as represented by the fast-access storage for example. Alternatively, the instructions may be contained in another signal-bearing media, such as a magnetic data storage diskette 500 (FIG. 5), directly or indirectly accessible by the CPU 411.

Whether contained in the diskette 500, the computer/CPU 411, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

From the above description, it should be clear to one of ordinary skill in the art that the present invention provides a new method of enforcing authentication and authorization to a resource in which a client application makes an initial resource access request intended to invoke authentication and authorization services to evaluate a resource access request. A security app, separate from the client application, then executes processing for a challenge-response protocol with the authorization server, using push notification from the authorization server on an out-of-band channel.

Although the present invention is particularly applicable to client applications on mobile computing devices, such as cellular phones, tablet computers, or hand-held multi-function computing devices, the present invention is not intended as limited to such hand-held devices, since its concepts are clearly applicable in other environments. Similar to conventional apps that are downloaded onto mobile devices and desktop computers, the security app of the present invention is envisioned as being implemented as a downloadable app.

It is further envisioned that the security app concept described herein not be limited to portable user devices such as cellular phones, etc. Rather, the security app concept is intended as also extending to other types of devices having a processor or microprocessor mechanism or control mechanism, such as embedded devices, which could reasonably benefit from authentication/authorization services. Examples of such embedded devices include, but are not limited to, such devices as printers, refrigerators, air conditioning units or systems, automobiles or other vehicles, or other devices having electronic control mechanisms for which a security app could be incorporated.

It is further envisioned that the security app of the present invention might be joined with a second app having another function. For example, in an app having a first, primary function to locate an iPhone, the security app of the present invention might be included to provide authentication/authorization function(s) for the iPhone finder app, while additionally being capable of providing authentication/authorization function(s) for additional, separate apps, in the manner described herein for the present invention.

Thus, in this sense, the security app of the present invention is not necessarily completely isolated from another app. Rather, it could be joined as a unit with another app, but having the capability to provide the authentication/authorization functions for at least one other apps that is separate from the security app. Similarly, it is further envisioned that the security app concept described herein could be modularized and capable of being updated and/or customized for different configurations of authentication mechanisms actually installed on specific devices. Thus, for example, one security app configuration might be used on a device having one biometric authentication mechanism while another configuration might be used with a different biometric mechanism or with a geolocation mechanism. This customization/updatability aspect of the present invention would allow security apps to evolve as new technologies evolve for authentication of user devices.

The present inventors are not aware of any existing generalized solution for mobile applications which will allow one to easily adapt existing applications and services to support new authentication techniques such as biometrics and location. While there are many authentication solutions for the traditional desktop environment, the present inventors believe that there is a need for a solution that provides a simple, flexible and configurable authentication framework that supports existing mobile apps and services with no application code changes, and that work without "jail breaking" the device.

Moreover, the simplicity of the mechanism is very important for security, reliability, and usability. The approach described herein can be used with reverse proxies or integrated with networked services in a manner that is consistent with existing authentication services.

The solution of the present invention is simple, flexible, and supports existing and new mobile applications. It also keeps security credentials separate from the mobile app. It is easy to update the mobile security service to support new authentication protocols as they are created. It is believed that this approach will be successful in supporting a wide range of authentication techniques for a broad range of mobile apps with no, or minimal, modification.

While the invention has been described in terms of a single preferred embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A method of enforcing authentication/authorization, said method comprising:
   making a resource access request, by a client application being executed by a processor on a digital device, to invoke services for evaluation of at least one of authentication and authorization of the resource access request by said client application; and
   activating and executing a security application on said digital device, said security application being separate from said client application, said security application comprising instructions for processing a challenge-response protocol for said resource access request,
   wherein said client application communicates outside said digital device using a primary communication channel and said security application uses a secondary communication channel that is out-of-band from said primary communication channel,
   wherein said resource access request, as sent by said client application, is received by a resource access authentication and authorization service,
   wherein said resource access authentication and authorization service uses a push notification to initially communicate with said security application for said processing of said challenge-response protocol for said resource access request, and
   wherein said security application is dormant until receiving said push notification from authentication and authorization service on said out-of-band secondary channel.

2. The method of claim 1, wherein said digital device comprises a processor-based mobile device.

3. The method of claim 2, wherein said digital device comprises one of a cellular phone, a tablet computer, and a hand-held multi-function computing device.

4. The method of claim 1, wherein said digital device comprises an embedded device having at least one of a processor and a microprocessor.

5. The method of claim 1, wherein said security application thereby executes authentication and authorization functions for said digital device relative to said client application, as separated from functions performed by said client application.

6. The method of claim 1, wherein said resource access request, as sent by said client application, is further received by a resource access authentication and authorization service and an access to said resource by said client application is suspended until a completion of authentication and authorization processing for said resource access request.

7. The method of claim 6, wherein said suspension of said access to said resource by said client application is removed upon a successful completion of said challenge-response protocol by said security application.

8. The method of claim 1, wherein said security application uses said out-of-band communication channel with said resource access authentication and authorization service for said processing of said challenge-response protocol.

9. The method of claim 1, as tangibly embodied as a program of machine-readable instructions on a non-transitory, computer-readable storage medium.

10. A method of enforcing authentication and authorization to a resource, said method comprising:
    receiving, in a network services authentication service, as executed by a processor on a computer, a resource access request from a client application on a user digital device, using a primary communication channel normally used by said client application; and
    if at least one of an authentication processing and an authorization processing is necessary for said received resource access request:
      suspending temporarily a processing of said resource access request;
      providing a push notification to a security application on said digital device that sent said resource access request, said push notification initiating a challenge/response protocol for said resource access request;
      removing the temporary suspension of said resource access request if a processing of said challenge/response protocol is successful; and
      rejecting the resource access request if the processing of the challenge/response protocol is unsuccessful,
    wherein said push notification and said challenge/response protocol are conducted using a secondary communication channel that is out-of-band from said primary communication channel normally used by said client application, and wherein said client application on said user digital device is separate from said security application on said user device, and said security application is normally dormant on said user digital device until activated by a receipt of said push notification.

11. A non-transitory, computer-readable storage medium tangibly embodying a program of machine-readable instructions executable by a digital processing apparatus to perform the method of enforcing authentication and authorization defined by claim 10.

12. A security app, as comprising a program of machine-readable instructions tangibly embodied on a non-transitory, computer-readable storage medium and executable by a digital processor when installed on a digital processing apparatus, said security app comprising instructions for:

receiving a push notification signal from an authentication and authorization service that is responding to a resource access request from a client app installed on said digital processing apparatus; and executing a challenge/response protocol processing for said resource access request, wherein said security app is separate from said client app on said digital processing apparatus, and wherein said security app is dormant on said digital processing apparatus until activated by receiving said push notification signal.

13. The security app of claim 12, as performing said challenge/response protocol processing for at least one client app installed on said digital processing apparatus that does not have an internal challenge/response protocol processing therein.

14. The security app of claim 12, wherein said push notification and communications for said challenge/response protocol processing occur in an out-of-band communication channel that comprises a secondary communication channel separate from a primary communication channel used by said client app.

15. The security app of claim 12, wherein said non-transitory, computer-readable storage medium comprises one of:

a random access memory (RAM) device in a digital device having at least one of a processor and a microprocessor that uses said RAM device for storing computer programs currently being executed by said processor or microprocessor;

a read only memory (ROM) device in said digital device having said processor or microprocessor, said ROM device used to store instructions not currently being executed;

a standalone memory device that stores digital data, said standalone memory device capable of interfacing with a digital device for downloading data stored thereon into a memory of said digital device; and a memory device in a network server, said memory device used for storing instructions to be downloaded upon request to user devices.

16. An apparatus, comprising:

a processor; and a memory, wherein said memory includes a first set of instructions to be selectively executed by said processor as a client app and a second set of instructions to be selectively executed by said processor as a security app, said security app being separate from said client app and said security app comprising instructions to process a challenge/response protocol for service requests initiated by said client app, wherein said client app uses a primary communication channel for operation of an application, wherein said security app uses a communication channel that is out-of-band from said primary communication channel, and wherein said security app is dormant on said apparatus until activated by a push notification signal from an authorization service that is requesting a challenge/response protocol processing for a service request initiated by said client app.

17. The method of claim 1, wherein said security application uses same operating parameters on each instantiation.

18. The method of claim 1, wherein said security application selectively varies at least one operating parameter on each instantiation.

19. The method of claim 18, wherein said security application varies at least one parameter based on one or more of a context, a history, and a situation.

20. The method of claim 18, wherein said at least one operating parameter comprises one or more of timing, frequency, security level, address, and protocol.

\* \* \* \* \*